United States Patent
Urfalioglu et al.

(10) Patent No.: US 9,866,766 B2
(45) Date of Patent: Jan. 9, 2018

(54) METHOD FOR OBTAINING A PICTURE AND MULTI-CAMERA SYSTEM

(71) Applicant: Huawei Technologies Co., Ltd., Shenzhen (CN)

(72) Inventors: Onay Urfalioglu, Munich (DE); Giovanni Cordara, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 50 days.

(21) Appl. No.: 15/147,482

(22) Filed: May 5, 2016

(65) Prior Publication Data

US 2016/0248988 A1 Aug. 25, 2016

Related U.S. Application Data

(63) Continuation of application No. PCT/EP2014/053088, filed on Feb. 18, 2014.

(51) Int. Cl.
- *H04N 5/232* (2006.01)
- *H04N 5/247* (2006.01)
- *G06T 7/00* (2017.01)
- *H04N 5/225* (2006.01)
- *H04N 5/235* (2006.01)

(52) U.S. Cl.
CPC ........... *H04N 5/247* (2013.01); *G06T 7/00* (2013.01); *H04N 5/2258* (2013.01); *H04N 5/2353* (2013.01); *H04N 5/23212* (2013.01); *H04N 5/23232* (2013.01); *H04N 5/23245* (2013.01); *G06T 2207/20021* (2013.01); *G06T 2207/30168* (2013.01)

(58) Field of Classification Search
CPC .... G06T 7/00; H04N 5/2258; H04N 5/23212; H04N 5/247; H04N 5/23232; H04N 5/23245; H04N 5/2353
See application file for complete search history.

(56) References Cited

U.S. PATENT DOCUMENTS

| | | | |
|---|---|---|---|
| 8,957,979 B2 * | 2/2015 | Ishino | H04N 5/23222 348/220.1 |
| 9,560,273 B2 * | 1/2017 | Meier | H04N 5/23241 |

(Continued)

OTHER PUBLICATIONS

Foreign Communication From a Counterpart Application, PCT Application No. PCT/EP2014/053088, International Search Report dated Jul. 2, 2014, 5 pages.

(Continued)

*Primary Examiner* — Nicholas Giles
(74) *Attorney, Agent, or Firm* — Conley Rose, P.C.

(57) ABSTRACT

A method and a multi-camera system for obtaining pictures with improved image quality. At least two cameras are used for each capturing an image, and a fast shooting mode is employed. The fast shooting mode may work in a preprocessing mode, in which the captured image of highest sharpness is acquired as a final picture, or may work in a post processing mode, in which multiple captured images are acquired, and are then post-processed to obtain a final picture of high image quality. In both modes it may be automatically determined, whether to activate the fast shooting mode or not. The determination is based on a relative movement of the multi-camera system to an object of interest, or is based on a shooting behavior of the user.

10 Claims, 3 Drawing Sheets

(56) References Cited

U.S. PATENT DOCUMENTS

| | | | |
|---|---|---|---|
| 2004/0130628 A1* | 7/2004 | Stavely | H04N 5/23248 348/208.4 |
| 2005/0128323 A1 | 6/2005 | Choi | |
| 2007/0052837 A1* | 3/2007 | Onozawa | H04N 5/23212 348/345 |
| 2007/0115459 A1* | 5/2007 | Nakao | H04N 5/2254 356/213 |
| 2008/0219654 A1 | 9/2008 | Border et al. | |
| 2009/0128642 A1 | 5/2009 | Koh et al. | |
| 2011/0242346 A1 | 10/2011 | Ego | |
| 2011/0279649 A1* | 11/2011 | Choi | H04N 5/23248 348/46 |
| 2013/0021487 A1* | 1/2013 | Ishino | H04N 5/23222 348/220.1 |
| 2013/0028582 A1 | 1/2013 | Batur et al. | |
| 2013/0229491 A1* | 9/2013 | Kim | G06F 3/017 348/46 |
| 2013/0242057 A1* | 9/2013 | Hong | H04N 13/0285 348/47 |
| 2014/0168429 A1* | 6/2014 | Ono | H04N 5/232 348/143 |
| 2014/0192206 A1* | 7/2014 | Holz | H04N 5/23241 348/169 |
| 2014/0192259 A1* | 7/2014 | Holz | H04N 5/23241 348/372 |
| 2015/0244935 A1* | 8/2015 | Meier | H04N 5/23241 348/372 |

OTHER PUBLICATIONS

Foreign Communication From a Counterpart Application, PCT Application No. PCT/EP20141053088, Written Opinion dated Jul. 2, 2014, 6 pages.

* cited by examiner

METHOD FOR OBTAINING A PICTURE AND MULTI-CAMERA SYSTEM

CROSS-REFERENCE TO RELATED APPLICATIONS

This application is a continuation of International Application No. PCT/EP2014/053088, filed on Feb. 18, 2014, which is hereby incorporated by reference in its entirety.

TECHNICAL FIELD

The present disclosure relates to a method for obtaining a picture with a multi-camera system, and relates further to such a multi-camera system for obtaining a picture. In particular, the method and the multi-camera system of the present disclosure use a fast shooting mode, in order to optimize the quality of pictures taken, for example, with a mobile phone or with another portable device.

BACKGROUND

However, in the method used in the prior art, a large quantity of division templates need to be stored, which occupies more storage space, thereby increasing a burden on an encoding and decoding system.

Nowadays, mobile phones and other portable devices are typically equipped with cameras. Normally, the auto-focus is considered to be one of the major weaknesses of such cameras installed in mobile devices, in particular because of its slow speed. Depending on the quality of the image sensor of the camera of the mobile device, the auto-focus may require up to several seconds to properly focus on an object of interest. This rather long time period significantly hampers the user experience, particularly because regularly out-of-focus pictures are obtained, further caused by the need to acquire images when the auto-focus is not completed yet.

The auto-focus of a camera of a mobile phone or portable device is typically configured to be always active, and to attempt a maximization of the sharpness of a camera image or of a particular salient region in the camera image.

A salient region is an area within an image, which depicts content deemed of most interest to the user. Typically, the salient region to focus on can be identified automatically by the device, or can be defined manually by the user. The focusing process of the auto-focus is typically terminated, when sharpness of a salient region is above a threshold or when the user shoots a picture (i.e. presses a dedicated "shutter release button", which may be realized by operating any button or using a touch screen of the mobile device)

SUMMARY

Embodiments of the present disclosure provide an image encoding and decoding method and apparatus, so as to lighten a burden on an encoding and decoding system.

In view of the above-mentioned drawbacks of the existing mobile device cameras, in particular in view of the slow speed of the auto-focus, the present disclosure intends to improve the existing state of the art. In particular, the object of the present disclosure is to provide a method and a camera system, respectively, with which the quality of obtained pictures can be improved. Thereby, the present disclosure aims to address the above-described auto-focus issues by using a fast shooting mode, which yields better results, in particular when the camera system or object of interest is moving. The present disclosure aims to avoid non-optimal quality pictures, which are obtained in the state of the art, when either the camera system or the object of interest is moving and/or the user shoots a picture, before the auto-focus process is finished.

The above-mentioned object is achieved by the solution provided in the enclosed independent claims. Advantageous implementations are defined in the respective dependent claims. In particular, the present disclosure proposes the use of a multi-camera system, i.e. a camera system having two or more cameras, in order to minimize the above-mentioned negative effects of the slow auto-focus on the image quality of the obtained pictures. The lenses of the at least two cameras are preferably controlled independently from each other, for example, to capture images with different focuses.

A first aspect of the present disclosure provides a method for obtaining a picture with a multi-camera system, comprising detecting a fast shooting mode condition, controlling at least two cameras each for capturing an image, if a fast shooting mode condition is detected, and obtaining the picture based on the at least two captures images.

In the present disclosure, the term "fast shooting mode" defines a mode, which is used in a situation that typically results in a non-optimal image quality of an obtained picture, because the auto-focus process has not finished its process yet. Such a situation is, for example, when the user shoots or requests to shoot a picture too quickly after activating the camera systems, or when the camera system or the object of interest, respectively, is moving.

In the present disclosure the term "auto-focus" describes a method for automatically focusing on a specified (salient) region of interest in an image captured by a camera. An "auto-focus process" involves the optimization of an objective function aiming at maximizing the sharpness in an image or in a salient region of the image. Thereby, focusing involves the movement of the camera lens to a certain position relative to the image sensor.

In the present disclosure, the term "sharpness" means the degree of image details, which can be distinguished.

In the present disclosure, the term "image sensor" defines an electronic chip containing a two-dimensional (2D) array of pixel elements. The chip is placed inside the camera, can be exposed to light, and is configured to determine the light intensities for each color and each pixel, when exposed to light. The resulting array of color values may be stored as an image.

In the method of the present disclosure, by detecting automatically the fast shooting mode condition, and by controlling in a fast shooting mode at least two separate cameras, the image quality of obtained pictures may be improved. In particular, the image quality can be improved, because the at least two cameras may adopt different configurations, for example, different focuses.

In a first implementation form of the method according to the first aspect, the method comprises evaluating the sharpness in at least a part of each of the at least two captured images, and acquiring the captured image having the highest sharpness to obtain the picture.

Since the at least two cameras may adopt different configurations, for example, different focuses (i.e. the at least two cameras may focus on objects in different distances to the camera), when the picture is shot and obtained, the likelihood to obtain a high quality picture by acquiring the captured image having the highest sharpness is increased.

In the present disclosure, "capturing an image" means a live view imaging of a certain field of view by a camera. The term "acquiring an image" means shooting the image and/or storing a captured image. In other words, although the at least two cameras may each simultaneously capture an image, only one of the at least two captured images, namely the captured image exhibiting the highest sharpness, may be acquired ("shot") and stored in the memory of the multi-camera system, when the user presses the dedicated "shutter release button".

In a second implementation form of the method according to the first implementation form of the first aspect, the method further comprises adjusting a lens of at least one camera before the step of acquiring the captured image based on the evaluated sharpness in at least the part of the image captured by the at least one camera.

For example, different exposure times may be set for the at least two cameras. The at least two cameras may also be adjusted to fully focus on differently distanced objects. It is also possible to adjust the exposure time or the focus distance of one or more cameras based on the evaluated sharpness of the captured images. For instance, the exposure time of the camera capturing the sharpest image can be modified, before acquiring the captured image, in order to further minimize blurriness.

In a third implementation form of the method according to the first aspect as such, the method comprises acquiring the at least two captured images, and post processing the at least two acquired images to obtain the picture.

In this case actually at least two captured images are acquired and stored, and are afterwards post processed to obtain a final optimized picture. By post processing a final picture from at least two acquired images, the image quality of the final picture can be significantly improved. Any suitable post processing method, e.g. a method for improving the quality of noisy images with different focuses, fusing the captured images to obtain an all-in-focus image, obtaining high dynamic range image can be applied. Several suitable post processing methods are known from the state of the art.

In a fourth implementation form of the method according to the third implementation form of the first aspect, the method further comprises evaluating the sharpness in at least a part of each of the at least two captures images, setting different exposure times for the at least two cameras according to a result of evaluating the sharpness (i.e. according to the evaluated sharpnesses in the images captured by the cameras), and acquiring with each camera the captured image based on the set exposure time of said camera.

In the present application the term "exposure time" means the period of time, over which an image sensor is exposed, in order to aggregate light.

With the method of the present disclosure, with each camera an image independent of the set exposure time of other cameras of the multi-camera system may be acquired. Due to the different exposure times, the post processed final picture has a better image quality.

In a fifth implementation form of the method according to the fourth implementation form of the first aspect, during setting the different exposure times, the exposure time for a camera capturing an image with lower sharpness is set longer than the exposure time for a camera capturing an image with higher sharpness. The set exposure times preferably scale linearly with the number of cameras according to the sharpness of the respectively captured images.

In other words, the exposure times scale with the sharpness. A comparatively high sharpness means a comparatively low exposure time, and vice versa. Thereby at least one image with more definite edges may be acquired, and at least one image with increased luminosity may be acquired.

With at least such two images, the quality of the final picture obtained by post processing the acquired images can be significantly improved.

In a sixth implementation form of the method according to any of the first, second, fourth and fifth implementation form, the step of evaluating the sharpness comprises iteratively measuring the sharpness in a salient region of each of the captured images.

A salient region is an area within a captured image, which depicts the content deemed of most interest for the user. While iteratively measuring the sharpness in the salient region, the lens position of each camera may be changed, i.e. the lens may be moved.

In a seventh implementation form of the method according to the first aspect as such or according to any of the previous implementation forms, the step of controlling the at least two cameras comprises regulating independently the lens positions of the at least two cameras.

By regulating independently said lens positions, the likelihood for obtaining a high quality picture, for example when acquiring the sharper one of the two captured images, is increased. In case of acquiring at least two captured images, the post processing thereof will yield a better final picture.

In an eighth implementation form of the method according to the first aspect as such or according to any of the previous implementation forms, the fast shooting mode condition is detected, if an auto-focus process is incomplete for each of the at least two cameras.

In a ninth implementation form of the method according to the first aspect as such or according to any of the previous implementation forms, the fast shooting mode condition is detected, if the multi-camera system is moving or an object of interest in at least one of the captured images (e.g. in salient region of the captured image) is moving relative to the multi-camera system.

Therefore, when the auto-focus process is not complete, or when the camera or object of interest is moving (this can be evaluated in several methods, e.g. applying image processing techniques or exploiting motion sensor information, when available), the fast shooting mode employing the at least two cameras is activated. Thereby, the image quality of the obtained picture can be improved regardless of the camera or object movement.

In a tenth implementation form of the method according to the first aspect as such or according to any of the previous implementation forms, a fast shooting mode is detected, if a command for obtaining the picture is detected after a time period less than a predetermined threshold value. The time period is measured from activating the multi-camera system.

The activating of the multi-camera system may be triggered by opening or activating a camera acquisition app on a mobile phone, which is equipped with a multi-camera system, and is able to carry out the method of the present disclosure. The activating of the multi-camera system may also be triggered when switching on the multi-camera system.

A second aspect of the present disclosure provides a multi-camera system for obtaining a picture, comprising a detecting unit for detecting a fast shooting mode condition, at least two cameras, each for capturing an image, and an image control unit for controlling the at least two cameras to obtain the picture based on the at least two captured images, if a fast shooting mode condition is detected.

The multi-camera system of the present disclosure achieves the same advantages as described above for the method of the first aspect, in particular may obtain pictures of better image quality.

In a first implementation form of the multi-camera system of the second aspect, the multi-camera system further comprises at least one sharpness detecting unit for evaluating the sharpness in at least a part of each of the at least two captured images.

In a second implementation form of the multi-camera system according to the second aspect as such or according to the first implementation form of the second aspect, the at least two cameras have an overlapping field of view.

Thereby, the captured images of the at least two cameras can be post processed into a final picture having better image quality.

In a third implementation form of the multi-camera system according to the second aspect as such or according to the first or second implementation form of the second aspect, the multi-camera system comprises at least one motion sensor for measuring a movement of the multi-camera system.

A third aspect of the present disclosure provides a computer program having a program code for performing the method according to the above first aspect and implementation forms of the first aspect, when the computer program runs on a computer.

BRIEF DESCRIPTION OF DRAWINGS

The above aspects and implementation forms of the present disclosure will be explained in the following description of the specific embodiments in relation to the enclosed drawings, in which.

DESCRIPTION OF EMBODIMENTS

In general, the present disclosure proposes a method and a multi-camera system, respectively, for optimizing the quality of 2D pictures (i.e. pictures in two-dimensional space) taken in a fast shooting mode. In particular, the method and multi-camera system may be applied and installed, respectively, in a mobile phone or another mobile device.

Figure 1:
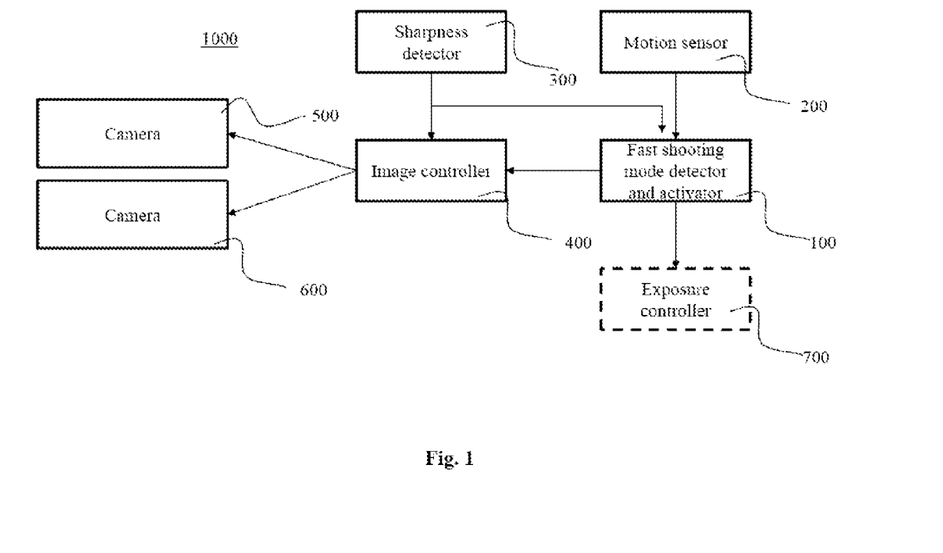
FIG. 1 is a block diagram of a multi-camera system according to an embodiment of the present disclosure.

FIG. 1 shows schematically a multi-camera system 1000 according to an embodiment of the present disclosure. The multi-camera system 1000 according to FIG. 1 includes two cameras 500 and 600, respectively. Each camera 500 and 600 may be equipped with at least a lens, a lens driver and a picture sensor. The lens drivers are able to change the positions of the respective lenses relative to the picture sensors of the two cameras 500 and 600. As an example, the lens drivers of the camera 500 and 600 may be configured to vary the distance between the lenses and the picture sensors of the camera 500 and 600. In other embodiments, the multi-camera system of the present disclosure may also include more than two cameras.

The multi-camera system 1000 further comprises an image controller 400, which is configured to regulate the position of the lenses of the two cameras 500 and 600. In particular, the image controller 400 is preferably able to coordinate the positions of the lenses of the two cameras 500 and 600, while iteratively monitoring the sharpness in a salient region of each of the two images, which are captured by the two cameras 500 and 600. For evaluating the sharpness in the captured images, the multi-camera system 1000 is equipped with a sharpness detector 300, which is configured to measure a degree of distinguishable image detail in each captured image, preferably in a salient region of each captured image, and to output the result as sharpness values to the image controller 400.

The output of the sharpness detector 300 is preferably also fed into a fast shooting mode detector and activator 100, which is also part of the multi-camera system 1000. The fast shooting mode detector and activator 100 is configured to detect a fast shooting mode condition, and to activate accordingly a fast shooting mode of the multi-camera system 1000, if such a fast shooting mode condition is detected.

A fast shooting mode condition may be detected, if the auto-focus process has not been completed yet, for example when the multi-camera system 1000 is moving with respect to an object of interest, or if an object of interest is moving with respect to the multi-camera system 1000. The fast shooting mode condition may also be detected, if a command for obtaining a picture is given by a user of the multi-camera system 1000 after a period of time, which is shorter than a predetermined threshold period measured from activating the multi-camera system 1000. That means, for example, that if a user shoots a picture right after activating the multi-camera system 1000, the fast shooting mode detector and activator 100 assumes that the auto-focus cannot yet have focused correctly. Thus, the fast shooting mode of the multi-camera system 1000 must be activated.

In order to determine, whether the multi-camera system 1000 is moving, the fast shooting mode detector and activator 100 may receive a signal from an optional motion sensor 200 of the multi-camera system 1000. However, a relative movement between an object of interest and the multi-camera system 1000 may also be obtained by analyzing the captured images of the at least two cameras 500 and 600.

The fast shooting mode detector and activator 100 of the multi-camera system 1000 may be configured to operate either in a post processing mode or in a pre processing mode, or partly in both modes. When the fast shooting mode detector and activator 100 operates in the pre processing mode, only one of two captured images is acquired when the user presses a dedicated "shutter release button". In particular, the captured image having higher sharpness, as evaluated by the sharpness detector 300, is acquired and obtained as the final picture. When the fast shooting mode detector and activator 100 operates in the post processing mode, the captured images of both cameras 500 and 600 are acquired, and the final picture is obtained by post processing the two acquired images.

Finally, the multi-camera system 1000 may optionally be equipped with an exposure controller 700, which is configured to control the exposure settings of one or both of the cameras 500 and 600, respectively. The exposure control may be applied right before acquiring a captured image, and may be applied to each one or individually to the two cameras 500 and 600.

Furthermore, the two cameras 500 and 600 of the multi-camera system 1000 can have an overlapping field of view. Hence, the salient region in which the sharpnesses are evaluated can be the same in the images captured by the cameras 500 and 600 of the multi-camera system 1000.

Figure 2:
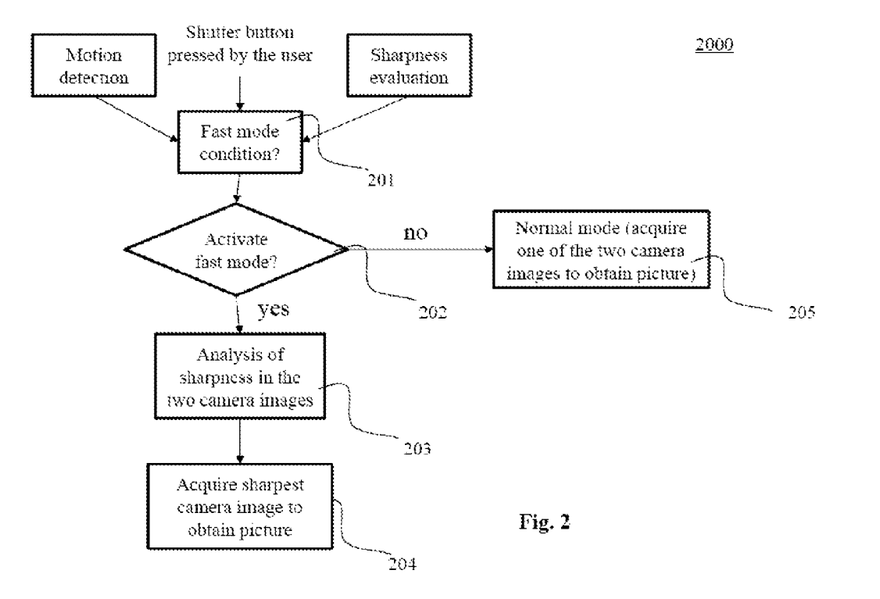
FIG. 2 is a flowchart of a method according to an embodiment of the present disclosure.

FIG. 2 shows a flowchart of a method 2000 for operating the multi-camera system 1000 according to an embodiment of the present disclosure in the preprocessing mode. In the preprocessing mode, at first, in step 201, after a user commands the device to shoot a picture, it is detected, whether a fast shooting mode condition occurs, and whether a fast shooting mode thus has to be entered. In particular, in step 201, three different conditions are preferably verified, in order to detect, if a fast shooting mode condition occurs.

A first condition is verified, if an auto-focus process has not yet been completed. This can be verified by using the sharpness detector 300 of the multi-camera system 1000, because if the auto-focus process has not been completed, a sharpness measured by the sharpness detector 300 has not yet converged to be above a certain threshold. A fast shooting mode condition is not detected, if any one of the two cameras 500 and 600 of the multi-camera system 1000 has completed its focusing procedure.

A second condition is verified, if the multi-camera system 1000 is moving. A motion of the multi-camera system 1000 may be measured by one or more motion sensors 200 of the multi-camera system 1000. Alternatively, a motion of the multi-camera system 1000, or a motion of an object of interest, may be measured by applying image processing techniques to the captured images.

A third condition is verified, if the user has activated the multi-camera system 1000, or has opened a camera application on the device, and request to shoot a picture in a very short time period after opening the application or after activating the multi-camera system 1000.

If any one of the above three conditions is verified, a fast shooting mode condition is detected. Accordingly, in step 202, depending on the occurrence of a fast shooting mode condition, the fast shooting mode procedure of the multi-camera system 1000 is activated or not. If no fast shooting mode condition has been detected, the fast shooting mode is not activated, and the multi-camera system 1000 continues in step 205 in a normal mode, in which a predetermined one of the two captured camera images is acquired, in order to obtain the final picture. In another embodiment, it is also possible that, in the normal mode, all the images focusing at different distances are shot simultaneously, in order to allow post-processing aiming at improving image quality.

However, if in step 201, it is detected that a fast shooting mode condition occurs, and in step 202 the fast shooting mode is accordingly activated, the sharpness in the two images captured by the two cameras 500 and 600 of the multi-camera system 1000 is evaluated in step 203. The sharpness can be evaluated either in a salient region of each of the two captured images, or can alternatively be evaluated in each full image. Thereby, it can be assessed, which of the two cameras 500 and 600 of the multi-camera system 1000 captures the sharper image, due to its lens being positioned better for producing an in-focus image. Accordingly, in step 204, the sharper camera image is acquired, in order to obtain the final picture. Optionally, right before acquiring the sharper image to obtain the final picture, one or more lens adjustment may be performed, for example, changing the exposure time or finely tuning the lens position of one or both cameras 500 and 600 of the multi-camera system 1000.

Figure 3:
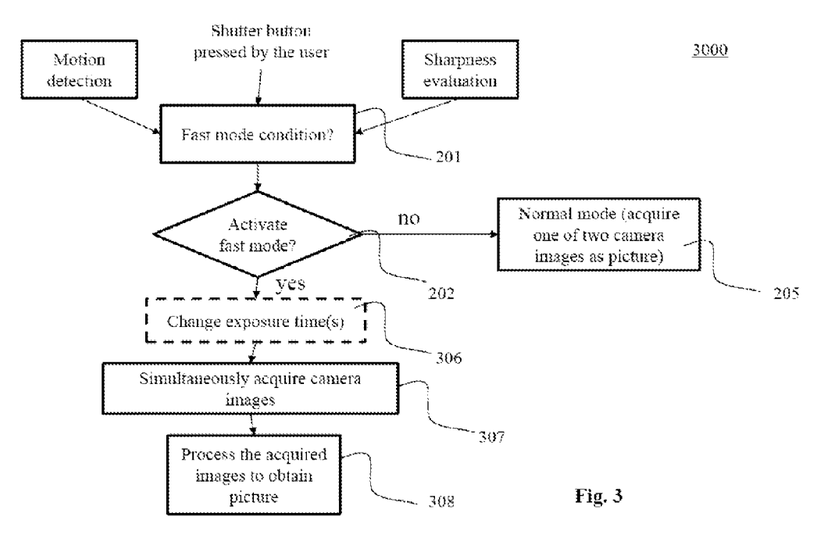
FIG. 3 is a flowchart of a method according to an embodiment of the present disclosure.

FIG. 3 shows a flowchart of a method 3000 for operating the multi-camera system 1000 according to an embodiment of the present disclosure in the post-processing mode. Compared with the preprocessing mode described above, the steps 201, 202, and 205 are identical in both cases. That means, initially a fast mode condition is detected, in step 201, a fast mode is activated or not in step 202, and a normal camera mode is used in step 205, if no fast shooting mode condition is detected and the fast shooting mode is not activated.

The difference to the preprocessing mode resides mainly in the actuation phase of the cameras 500 and 600 of the multi-camera system 1000. For the post-processing mode case more complexity is required, but the image quality of the final picture may be maximized. For the preprocessing mode, the execution time and complexity are minimized, with small compromises on the image quality of the final picture. Both cases, however, improve the image quality of the final picture compared to state of the art camera systems of mobile devices.

In the post-processing mode, in step 307, if the fast shooting mode has been detected and activated in steps 201 and 202, the images captured by the two cameras 500 and 600 of the multi-camera system 1000 are acquired simultaneously. The acquired camera images are then post-processed, in order to obtain a final picture having optimized image quality. Any method for improving the quality of noisy images with different focuses can be applied in step 308. For example, "Variational Models for Fusion and Denoising of Multifocus Images" proposed by W. W. Wang, provides a suitable post-processing method.

In order to achieve even better results, acquired images of different exposures can be provided to the post-processing method. To this end, different exposure times need to be set for the different cameras 500 and 600 of the multi-camera system 1000, which is optionally done in step 306 of FIG. 3. The exposure times set for the two cameras 500 and 600 of the multi-camera system 1000 are selected according to the sharpness evaluated in the captured images by the sharpness detector 300 of the multi-camera system 1000. A shorter exposure time is preferably assigned to the camera (e.g. the camera 500 of the multi-camera system 1000) currently capturing the image with higher sharpness as evaluated by the sharpness detector 300 of the multi-camera system 1000, in order to acquire an image having definite edges. A longer exposure time is preferably assigned to the camera (e.g. the camera 600 of the multi-camera system 1000) currently capturing the image with lower sharpness as evaluated by the sharpness detector 300 of the multi-camera system 1000, in order to acquire an image with increased luminosity. Post-processing such images in combination with the proposed methods achieves improved results.

In general, if more than two cameras 500 and 600 are used by the multi-camera system 1000, the set exposure time preferably scales linearly with the number of cameras according to the sharpness of the respectively captured images.

In summary, the present disclosure provides a method and a multi-camera system 1000 for obtaining pictures with improved image quality. Therefore, the method and multi-camera system 1000 use at least two cameras 500 and 600, and work in a preprocessing mode, in which the captured image of highest sharpness is acquired, or work in a post-processing mode, in which multiple captured images are acquired and then post-processed, in order to obtain a picture of higher image quality. In both cases the method and the multi-camera system 1000 are able to automatically detect, whether to activate a fast shooting mode or not, namely based on an absolute movement of the multi-camera system 1000 or a relative movement between the multi-camera system 1000 and an object of interest (e.g. in a salient region of at least one of the captured images) or based on a shooting behavior of the user. The method and multi-camera 1000 of the present disclosure can thus overcome one of the major drawbacks of existing mobile device cameras, namely the slow auto-focus, which typically has not completed its auto-focus procedure when a picture is quickly shot by a user, or when an object of interest or the mobile device itself moves.

The present disclosure has been described in conjunction with various embodiments as examples as well as implementations. However, other variations can be understood and effected by those skilled in the art and practicing the claimed disclosure, from the study of the drawings, the disclosure and the independent claims. In the claims as well as in the description the word "comprising" does not exclude other elements or steps and the indefinite article "a" or "an" does not exclude plurality. A single element or other unit may fulfill the functions of several entities or items recited in the claims. In fact certain measures are recited in the mutual different dependent claims does not indicate that a combination of these measures cannot be used in advantageous implementation. A single processor or other unit may fulfill the functions of several items recited in the claims. The mere fact that certain measures are recited in mutually different dependent claims does not indicate that a combination of these measured cannot be used to advantage. A computer program may be stored/distributed on a suitable medium, such as an optical storage medium or a solid-state medium supplied together with or as part of other hardware, but may also be distributed in other forms, such as via the Internet or other wired or wireless telecommunication systems.

The methods described herein may be supplemented by the features of the apparatuses described herein in terms of method steps and vice versa.

What is claimed is:

1. A method for obtaining a picture with a multi-camera system, the method comprising:
   detecting a fast shooting mode condition;
   capturing a first image with a first camera when the fast shooting mode condition is detected;
   capturing a second image with a second camera when the fast shooting mode condition is detected;
   evaluating a first sharpness of a first part of the first image;
   evaluating a second sharpness of a second part of the second image;
   setting a first exposure time for the first camera based on the first sharpness;
   setting a second exposure time for the second camera based on the second sharpness;
   capturing a third image with the first exposure time;
   capturing a fourth image with the second exposure time; and
   obtaining the picture based on the third image and the fourth image.

2. The method of claim 1, wherein the first exposure time is set longer than the second exposure time, when the first image is less sharp than the second image.

3. The method of claim 1, wherein evaluating the first sharpness and evaluating the second sharpness comprises iteratively measuring the first sharpness and the second sharpness.

4. The method of claim 1, wherein the fast shooting mode condition comprises an autofocus process being incomplete.

5. The method of claim 1, wherein the fast shooting mode condition comprises the multi-camera system is moving.

6. The method of claim 1, wherein the fast shooting mode condition comprises an object of interest is moving relative to the multi-camera system.

7. The method of claim 1, wherein the fast shooting mode condition comprises receiving a command for obtaining the picture being detected after a time period less than a predetermined threshold value, wherein the time period is measured from activating the multi-camera system.

8. A multi-camera apparatus for obtaining a picture, the multi-camera apparatus comprising:
   a first camera;
   a second camera;
   a processor in communication with the first camera and the second camera; the processor configured to:
      detect a fast shooting mode condition;
      evaluate a first sharpness of a first part of a first image captured by the first camera when the fast shooting mode condition is detected;
      evaluate a second sharpness of a second part of a second image captured by the second camera when the fast shooting mode condition is detected;
      set a first exposure time for the first camera based on the first sharpness;
      set a second exposure time for the second camera based on the second sharpness; and
      obtain the picture based on a third image captured with the first exposure time and a fourth image captured with the second exposure time.

9. The multi-camera apparatus of claim 8, wherein the first camera and the second camera comprise an overlapping field of view.

10. A non-transitory computer readable storage medium comprising program instructions that when executed by a processor of a multi-camera apparatus cause the multi-camera apparatus to:
   detect a fast shooting mode condition;
   evaluate a first sharpness of a first part of a first image captured by the first camera when the fast shooting mode condition is detected;
   evaluate a second sharpness of a second part of a second image captured by the second camera when the fast shooting mode condition is detected;
   set a first exposure time for the first camera based on the first sharpness;
   set a second exposure time for the second camera based on the second sharpness; and
   obtain the picture based on a third image captured with the first exposure time and a fourth image captured with the second exposure time.

* * * * *

UNITED STATES PATENT AND TRADEMARK OFFICE
CERTIFICATE OF CORRECTION

PATENT NO. : 9,866,766 B2  
APPLICATION NO. : 15/147482  
DATED : January 9, 2018  
INVENTOR(S) : Onay Urfalioglu et al.

Page 1 of 1

It is certified that error appears in the above-identified patent and that said Letters Patent is hereby corrected as shown below:

Page 2 Other Publications should read:
Foreign Communication From a Counterpart Application, PCT Application No. PCT/EP2014/053088, Written Opinion dated Jul. 2, 2014, 6 pages Signed and Sealed this
Seventeenth Day of April, 2018

Andrei Iancu
*Director of the United States Patent and Trademark Office*